US005725618A

United States Patent [19]
Shimoda et al.

[11] Patent Number: 5,725,618
[45] Date of Patent: Mar. 10, 1998

[54] BACK WASHING AND REGENERATING APPARATUS FOR DIESEL PARTICULATE FILTER

[75] Inventors: Mastoshi Shimoda; Tatsuki Igarashi, both of Tokyo; Takao Tanizawa, Saitama-ken, all of Japan

[73] Assignee: Hino Motors, Ltd., Tokyo, Japan

[21] Appl. No.: 711,803

[22] Filed: Sep. 10, 1996

[30] Foreign Application Priority Data

Oct. 16, 1995 [JP] Japan .................. 7-266962

[51] Int. Cl.$^6$ .................................. B01D 41/04
[52] U.S. Cl. .................. 55/283; 55/302; 55/DIG. 30; 60/311
[58] Field of Search .................. 55/301, 302, 303, 55/304, 305, DIG. 30, 282–284, 430, 431, 466, 218, 400, 385.3; 60/311, 320, 324; 96/143–146

[56] References Cited

U.S. PATENT DOCUMENTS

| 3,748,836 | 7/1973 | Bachle ..................... 55/302 |
| 4,833,883 | 5/1989 | Oda et al. ................. 55/302 |
| 4,836,834 | 6/1989 | Steele ..................... 55/302 |
| 4,935,042 | 6/1990 | Sudo et al. ............ 55/DIG. 30 |
| 5,178,652 | 1/1993 | Huttlin .................... 55/302 |
| 5,347,809 | 9/1994 | Moeckel et al. ....... 55/DIG. 30 |
| 5,426,936 | 6/1995 | Levendis et al. ............ 55/302 |
| 5,565,012 | 10/1996 | Buodd ..................... 55/302 |

FOREIGN PATENT DOCUMENTS

| 778537 | 7/1957 | United Kingdom ............ 55/302 |

OTHER PUBLICATIONS

910326 SAE Technical Paper Series on: Development of Particulate Trap System with Cross Flow Ceramic Filter and Reverse Cleaning Regeneration, pp. 109–120, Feb. 25–Mar. 1, 1991.

910138 SAE Technical Paper series on: Development of Diesel Particulate Trap Systems for City Buses, pp. 83–92, Feb. 25–Mar. 1, 1991.

*Primary Examiner*—Richard L. Chiesa
*Attorney, Agent, or Firm*—McCormick, Paulding & Huber

[57] ABSTRACT

A back washing and regenerating apparatus for a diesel particulate filter, which can reliably, efficiently and instantly back wash particulate filters to regeneration in all zones which are not locally restricted. An impact air valve is positioned downstream of a particulate filter for blowing off particulates adhered to the particulate filter by an impact wave from the impact air valve into a particulate burning section and burning them off by the heat of a heater in the particulate burning section.

7 Claims, 7 Drawing Sheets

BACK WASHING AND REGENERATING APPARATUS FOR DIESEL PARTICULATE FILTER

BACKGROUND OF THE INVENTION

1. Field of the Invention

This invention relates to a back washing and regenerating apparatus for a diesel particulate filter.

2. Description of the Prior Art

The recent demands for cleanup of the environment has led to a tightening of regulations against automobile exhaust gas, particularly NOx (nitrogen oxides) and particulates (particulate materials in exhaust gas) in the case of diesel engine cars.

The NOx can be reduced by delaying the fuel injection time or otherwise lowering the combustion temperature. However, the particulates increase and a particulate filter is provided in an exhaust passage of an engine to trap the particulates from exhaust gas.

The particulate filter must be regularly back washed sufficiently to avoid it clogging up with the particulates trapped and accumulated, such a condition would result in an increase in exhaust resistance and a decrease in the engine output power.

Figure 7:
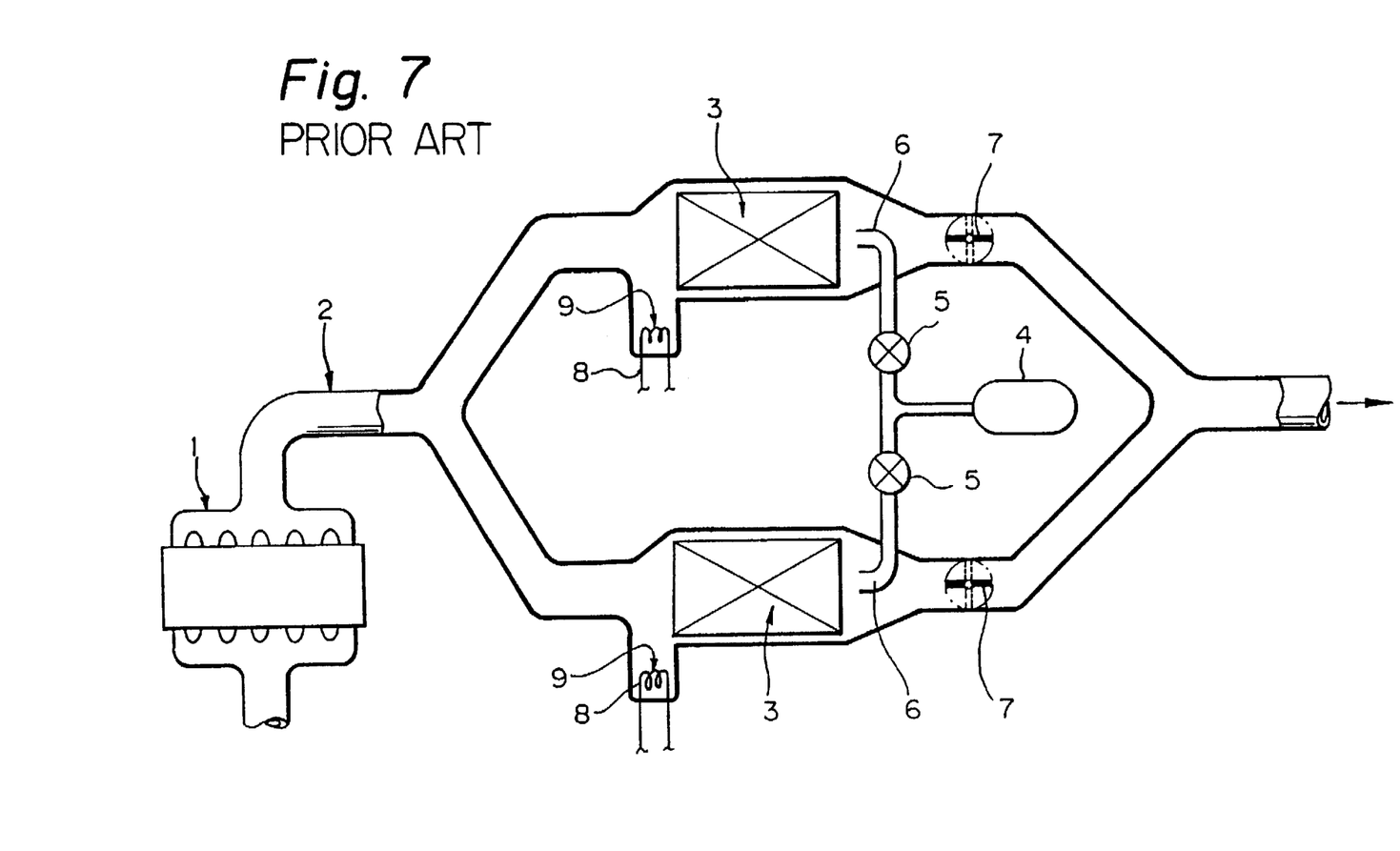
FIG. 7 is a schematic view of the structure of a conventional apparatus.

FIG. 7 shows an example of the conventional back washing and regenerating apparatus for a diesel particulate filter, which divides an exhaust passage 2 of an engine 1 into two lines each including in its course a particulate filter 3 formed of a ceramic honeycomb filter or other element, a back washing air nozzle 6 downstream of the particulate filter 3 for blowing a high-pressure air stored in an air tank 4 onto the particulate filter 3 by opening a valve 5, and an on-off valve 7 for closing the exhaust passage 2 on the corresponding side when the particulate filter 3 is back washed by the back washing air nozzle 6, said each line further including a particulate burning section 9 upstream of each particulate filter 3 for recovering particulates blown off from the particulate filter 3 back washed by the back washing air nozzle 6 and burning them off with a heater 8.

During normal operation when the particulate filter 3 is not clogged in the conventional back washing and regenerating apparatus for a diesel particulate filter as shown in FIG. 7, particulates contained in the exhaust gas discharged from the engine 1 are trapped by the particulate filter 3 while they flow through the particulate filter 3 and the exhaust gas is removed as clear gas.

When the particulate filter 3 is clogged with accumulated particulates thereby increasing exhaust resistance after a period of operation, the on-off valve 7 of one of the two lines closes and the valve on the corresponding line opens in response to a control signal from a control unit based on a detection signal from a pressure detector not shown so that high-pressure air stored in the air tank 4 is blown to the particulate filter 3 onto the corresponding line as back washing flow. The particulates adhered to the particulate filter 3 are thus blown off into the particulate burning section 9 and burned off by the heat of the heater 8 electrically excited, whereby the one particulate filter 3 is freed from clogging to decrease exhaust resistance and ready to trap particulates again.

Once the particulate filter 3 on one line has been back washed and regenerated, the valve 5 closes and the on-off valve 7 opens on the corresponding line, then the on-off valve 7 closes and the valve 5 opens on the other line so that the particulate filter 3 on said other line is back washed and regenerated in the same manner as described above.

3. Problems to be Solved by the Invention

However, such a conventional back washing and regenerating apparatus for a diesel particulate filter which uses one cylindrical back washing air nozzle 6 at a core zone of the particulate filter 3 for each line has the drawback that the back washing flow enters the particulate filter 3 with directivity to some extent without diffusing all over the filter when a high-pressure air stored in the air tank 4 is simply blown onto the particulate filter 3 as back washing flow from the back washing air nozzle 6. As a result, the particulate filter 3 can not be sufficiently back washed and regenerated, because the back washing air flow is not sufficiently distributed to the outer circumference or other zones and particulates still remain in such zones, though the core zone of the particulate filter 3 is relatively efficiently back washed and regenerated.

In view of the above actual situation, this invention provides a back washing and regenerating apparatus for a diesel particulate filter, which can reliably, efficiently and instantly back wash particulate filters in all zones which are not locally restricted.

SUMMARY OF THE INVENTION

Means to Solve the Problems

This invention relates to a back washing and regenerating apparatus for a diesel particulate filter, which blows air to a particulate filter on the way of an exhaust passage of an engine in the direction from the downstream side to the upstream side, characterized in that an impact air valve is provided downstream of the particulate filter for instantly releasing the air fed to a pressure accumulating chamber in an air chamber under the action of a valve body, thereby generating an impact wave.

The above means offers the following advantages.

During the normal operation when the particulate filter is not clogged, particulates contained in exhaust gas discharged from the engine are trapped by the particulate filter while they flow through the particulate filter, and the exhaust gas is removed as clear gas.

When the particulate filter is clogged with accumulated particulates and has an increased exhaust resistance after a certain period of operation, an impact wave is generated by instantly releasing air fed to the pressure accumulating chamber in the air chamber of the impact air valve under the action of the valve body which is then transferred to all over the downstream end face of the particulate filter, and the particulates adhered to the particulate filter can be reliably and efficiently blown off, whereby the entire particulate filter is no longer clogged and therefore reducing the exhaust's resistance, and is ready again to trap particulates.

BRIEF DESCRIPTION OF THE DRAWINGS

Preferred embodiments of this invention will now be described with reference to the accompanying drawings wherein.

DESCRIPTION OF THE PREFERRED EMBODIMENTS

FIGS. 1 to 4 show an embodiment of this invention, in which like parts are represented by the same references as in FIG. 7 and which comprises a particulate filter 3 rotatably provided on the way of an exhaust passage 2 and an impact air valve 10 downstream of the particulate filter 3 for generating an impact wave.

Figure 1:
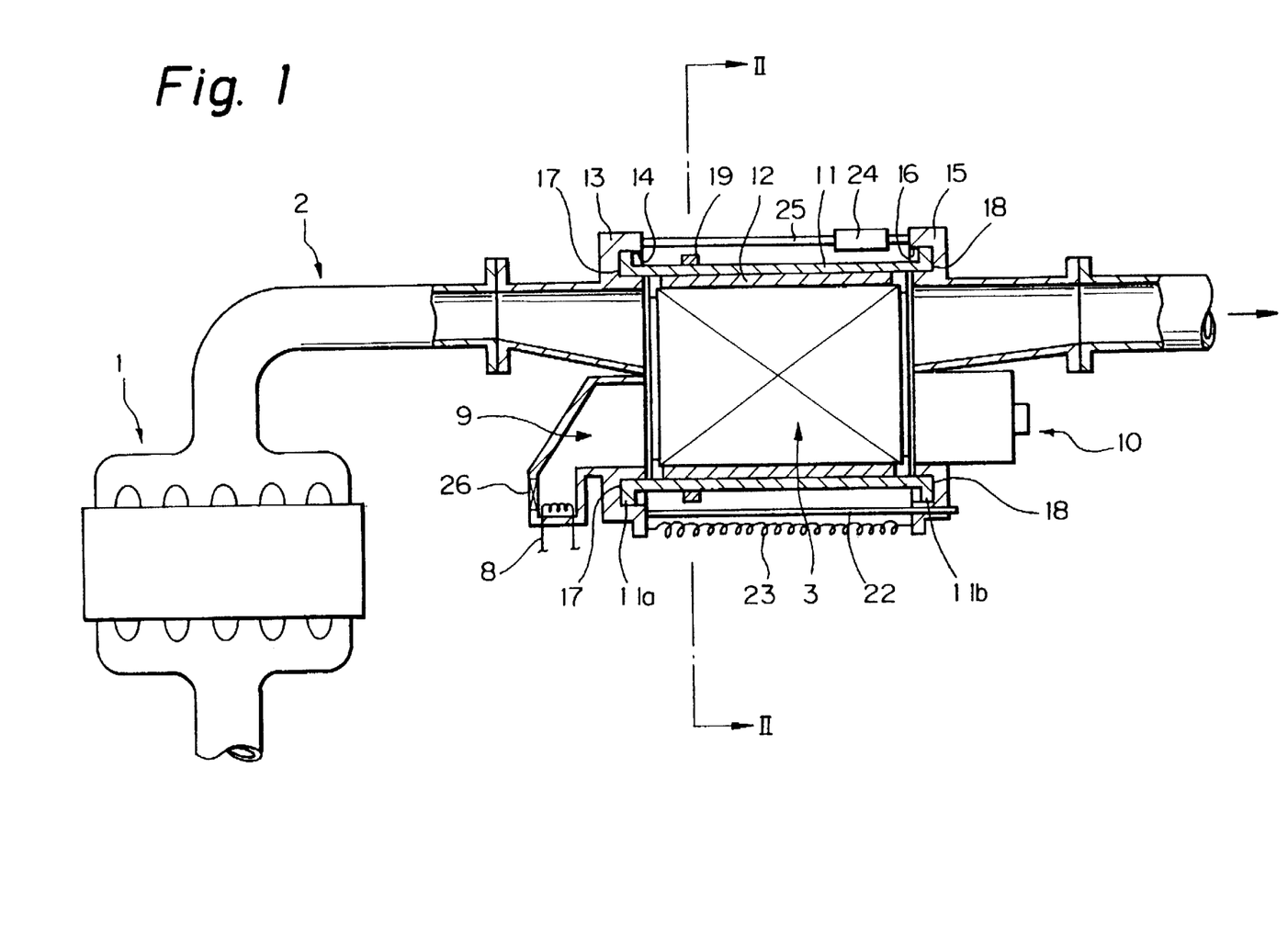
FIG. 1 is a side sectional view of one embodiment of this invention.
Figure 2:
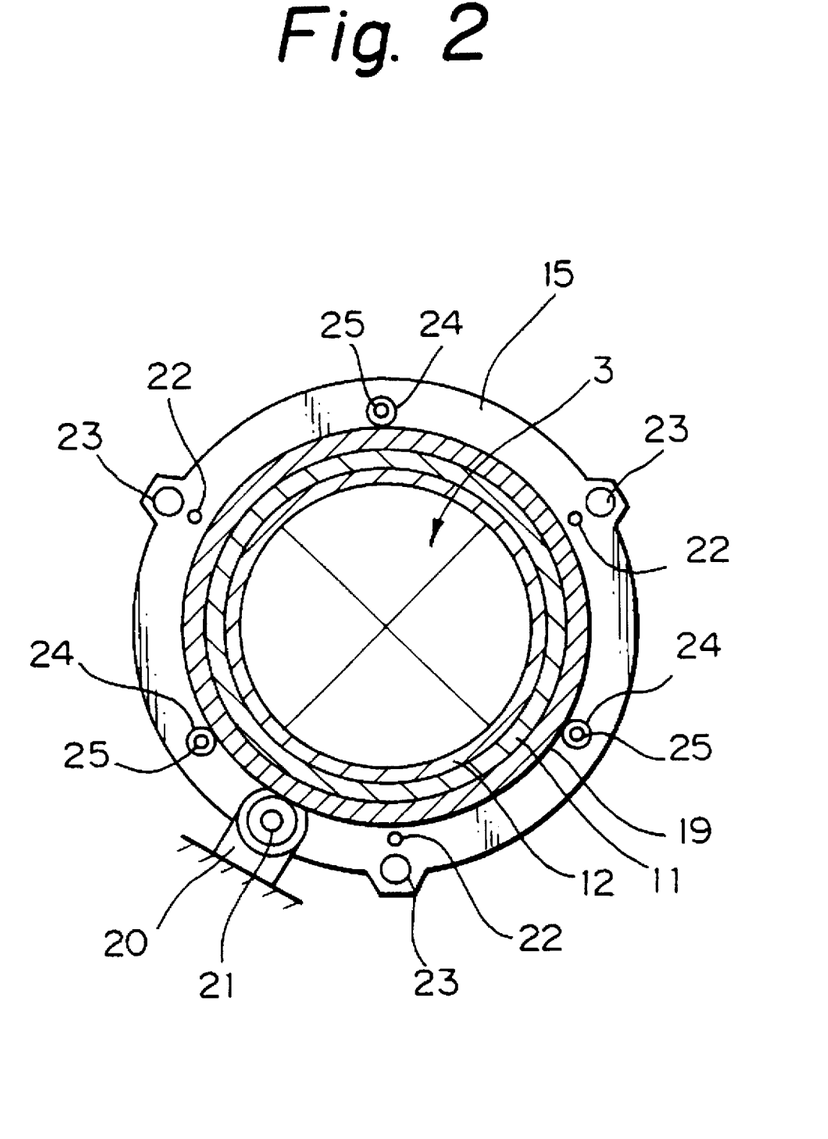
FIG. 2 is a sectional view taken along II—II line of FIG. 1.

The particulate filter 3 is received in a cylindrical filter case 11 via a filter retaining and thermal insulating material 12. The filter case 11 has flanges 11a, 11b formed at the both axial ends, i.e., the upstream and downstream ends of the filter case 11 and fitted into an annular groove 14 on an exhaust gas inlet side housing 13 and an annular groove 16 on an exhaust gas outlet side housing 15, respectively, to allow the filter case 11 to rotate while maintaining a seal against the outside at sealing surfaces 17, 18. A pinion gear 21 driven to rotate by a motor 20 is engaged with a ring gear 19 fitted around the outer circumference of the filter case 11 so that the particulate filter 3 can rotate integrally with the filter case 11 via the ring gear 19 by driving the pinion gear 21 to rotate by the motor 20.

The exhaust gas inlet side housing 13 and the exhaust gas outlet side housing 15 are connected to each other by guide shafts 22 provided at a plurality of desired circumferential sites (three sites in the illustrated example) in such a manner that they can be separated from each other by a minute distance in their axial direction. Normally, these housings are urged to approach each other under the urging force of a spring 23 to hold the filter case 11 therebetween from the upstream and downstream sides by applying a surface pressure of about 5 kg/cm² to adhere the sealing surfaces 17, 18 to the housings. When the filter case 11 is to be rotated, the surface pressure on the sealing surfaces 17, 18 is lowered to about 0.5 kg/cm² by slightly elongating air cylinders 24 provided at a plurality of desired cylindrical sites (three sites in the illustrated example) against the urging force of the spring 23 whereby the filter case 11 can smoothly rotate without damaging the seal.

In FIG. 1, the reference 25 represents an air cylinder bracket supporting the air cylinder 24 and the reference 26 represents a subfilter for assuring that only air may be extracted and particulates will not leak out during back washing.

Figure 3:
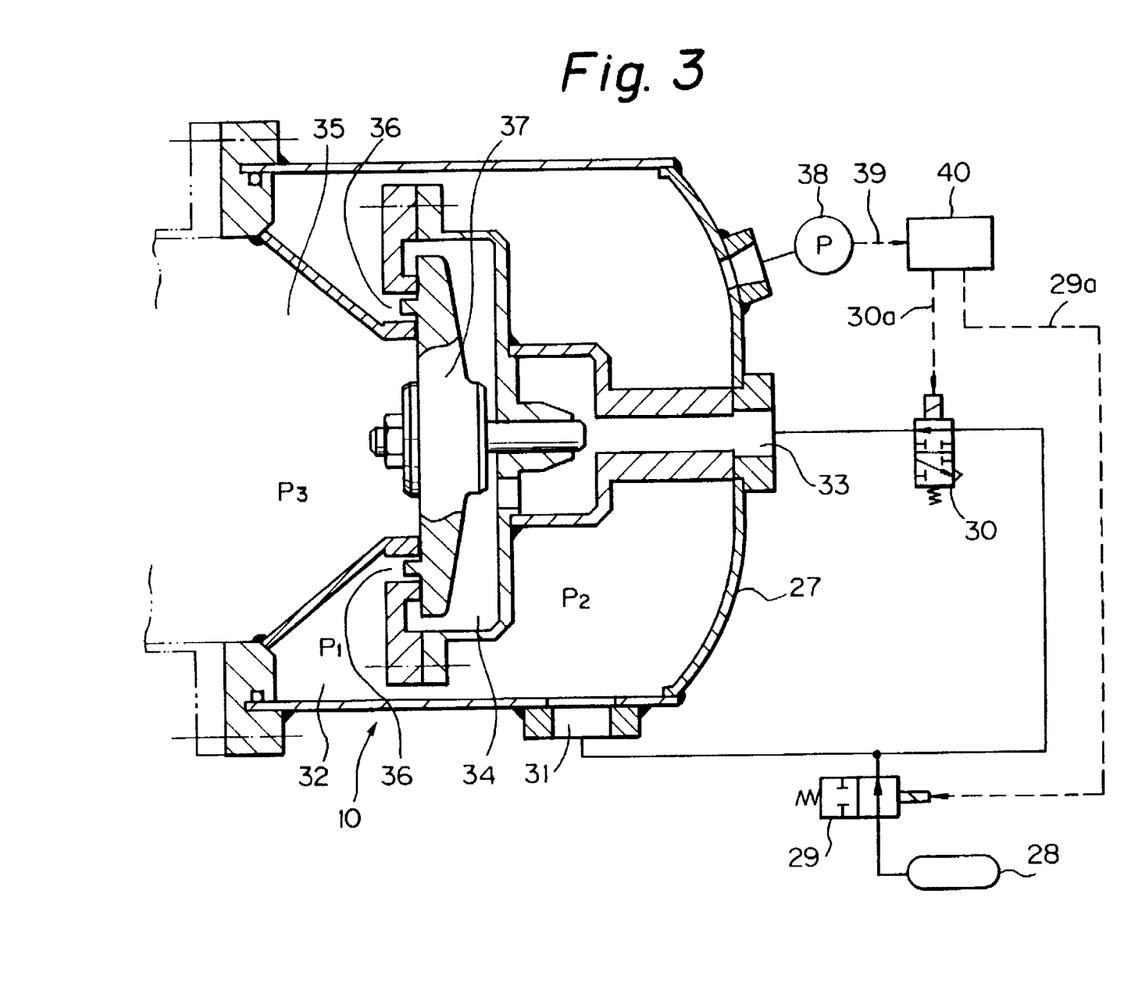
FIG. 3 is a sectional view showing an impact air valve in said one embodiment of this invention before an impact wave is generated.
Figure 4:
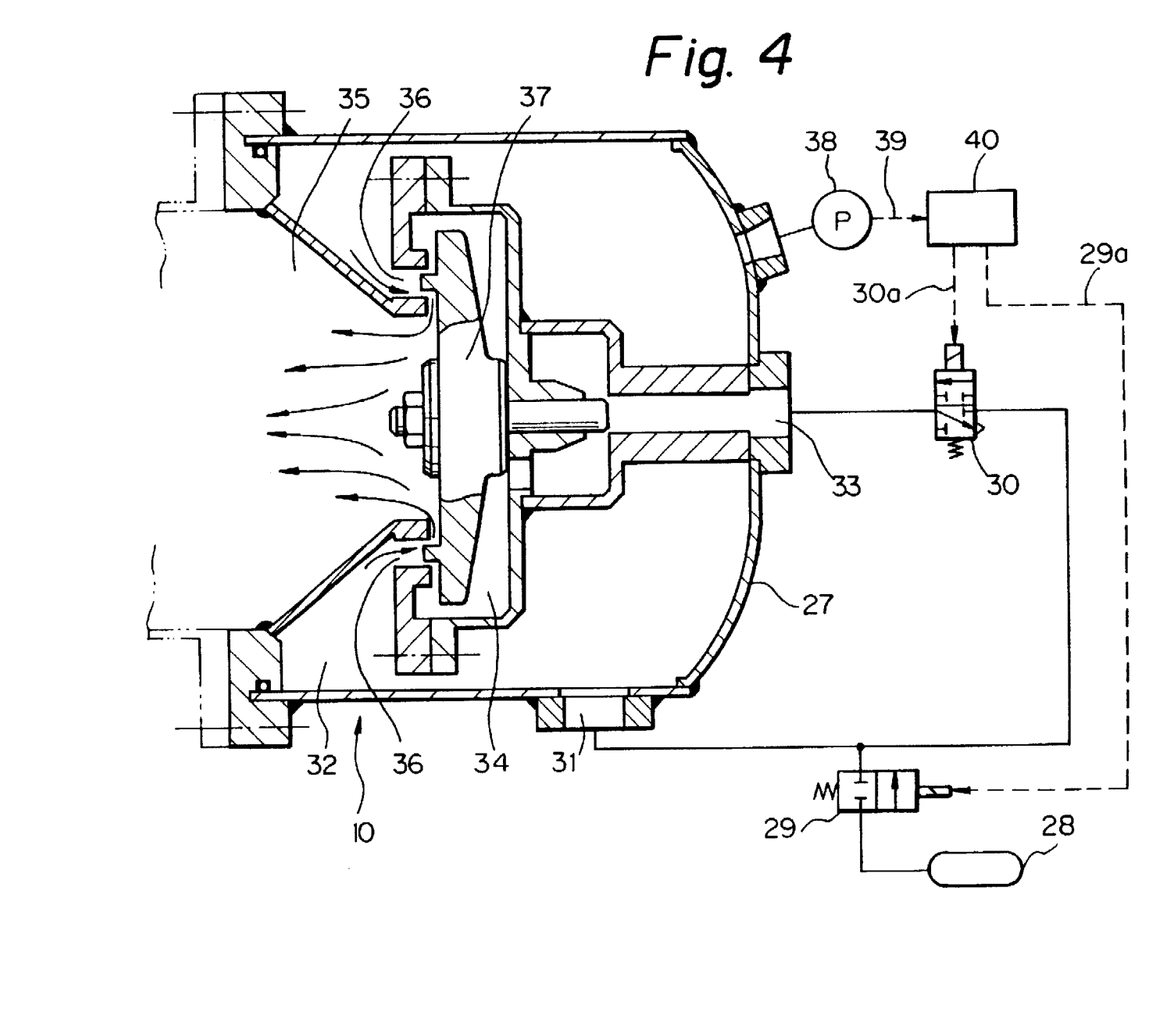
FIG. 4 is a sectional view showing an impact air valve in said one embodiment of this invention when an impact wave is being generated.

As shown in FIGS. 3 and 4, the impact air valve 10 includes an air chamber 27 integrally connected to the exhaust gas outlet side housing 15, said air chamber forming therein a pressure accumulating chamber 32 fed with a high-pressure air contained in an air tank 28 through a pressurizing port 31 by switching on an electromagnetic valve 29, a pressure releasing chamber 34 fed with the high-pressure air contained in the air tank 28 through a pressurizing outlet port 33 by switching on electromagnetic valves 29, 30 and releasing thus fed high-pressure air through the pressurizing outlet port 33 by switching the electromagnetic valve 30, and an impact wave generating chamber 35 opposed to a lower half of the downstream end face of the particulate filter 3 for delivering an impact wave to the particulate filter 3.

The impact air valve further includes a valve body 37 between the pressure accumulating chamber 32 and the impact wave generating chamber 35, which valve body opens upon release of the high-pressure air from the pressure releasing chamber 34 to connect the pressure accumulating chamber 32 and the impact wave generating chamber 35 through an outflow path 36 as shown in FIG. 4. Said impact air valve functions to deliver an impact wave to the particulate filter 3 by switching on the electromagnetic valves 29, 30 in response to switching commands 29a, 30a from an impact air valve control unit 40 based on a detection signal 39 from a chamber pressure detector 38 detecting the pressure in the pressure accumulating chamber 32.

The operation of the above illustrated example will now be explained. During the normal operation when the particulate filter 3 is not clogged, particulates contained in exhaust gas discharged from the engine 1 are trapped by the particulate filter 3 while they pass through the particulate filter 3, and the exhaust gas is removed as clear gas.

At this stage, the air cylinder 24 is not elongated but contracted, and the exhaust gas inlet side housing 13 and the exhaust gas outlet side housing 15 are urged to approach each other under the urging force of the spring 23 to hold the filter case 11 therebetween from the upstream and downstream sides by applying a surface pressure of about 5 kg/cm² to adhere the sealing surfaces 17, 18 to the housings, and thus prevent the exhaust gas from leaking out.

When the particulate filter is clogged with accumulated particulates to increase exhaust resistance after a period of operation, the pinion gear 21 is driven to rotate by the motor 20 at a surface pressure lowered to about 0.5 kg/cm² on the sealing surfaces 17, 18 by slightly elongating the air cylinders 24 against the urging force of the spring 23, whereby the particulate filter 3 rotates integrally with the filter case 11 without damaging the seal against the exhaust gas and then stops after it has rotated to a desired angle and the air cylinders 24 contract again.

Then, the electromagnetic valves 29, 30 are switched on in response to the switching commands 29a, 30a from the impact air valve control unit 40 as shown in FIG. 3, and the high-pressure air contained in the air tank 28 is supplied to the pressure accumulating chamber 32 through the pressurizing port 31 and to the pressure releasing chamber 34 through the pressurizing outlet port 33, with the result that the pressure $P_1$ in the pressure accumulating chamber 32 and the pressure $P_2$ in the pressure releasing chamber 34 are raised to a certain value (about 3 to 6 kg/cm²).

At this stage, the valve body 37 is firmly closed because $P_1=P_2$ and the relation between the pressure receiving area $S_1$ of the valve body 37 from the pressure accumulating chamber 32 and the pressure receiving area $S_2$ of the valve body 37 from the pressure releasing chamber 34 is expressed by $S_1 < S_2$, therefore $P_2 \cdot S_2 > P_1 \cdot S_1 + P_3 \cdot S_3$ wherein $S_3$ is the pressure receiving area of the valve body 37 from the impact wave generating chamber 35 since the pressure $P_3$ in the impact wave generating chamber 35 is almost equal to the pressure of the exhaust gas and slightly higher than the atmospheric pressure.

Once the pressure $P_1$ in the pressure accumulating chamber 32 and the pressure $P_2$ in the pressure releasing chamber 34 are raised to a certain value, the switching commands 29a, 30a are delivered from the impact air valve control unit 40 to the electromagnetic valves 29, 30 on the basis of the detection signal 39 from the chamber pressure detector 38, and thus the electromagnetic valves 29, 30 are switched on as shown in FIG. 4.

Then, the high-pressure air in the pressure releasing chamber 34 is instantly released to the atmosphere and the valve body 37 rapidly opens to cause the high-pressure air in the pressure accumulating chamber 32 to flow out through the outflow path 36 to the impact wave generating chamber 35 as it rapidly expands, whereby an impact wave is generated and transferred to the entire surface of a lower half of the downstream end face of the particulate filter 3. As a result, the particulates adhered to the particulate filter 3 are blown off into the particulate burning section 9 as shown in FIG. 1 and burned off in the particulate burning section 9 by the heat of the heater 8 electrically excited.

By appropriately repeating the above operation, the entire particulate filter 3 is freed from clogging to increase exhaust's efficiency and in ready to trap particulates again.

By applying an impact wave from the impact air valve 10, the particulate filter 3 can be reliably, efficiently and instantly back washed and regenerated in all zones which are not locally restricted. In the illustrated example, the size and weight can also be reduced because the exhaust passage 2 need not be divided into two lines.

In the example described above, the exhaust gas inlet side housing 13 and the exhaust gas outlet side housing 15 are urged to approach each other by the spring 23 and the urging force is relieved by elongating the air cylinders 24. However, the exhaust gas inlet side housing 13 and the exhaust gas outlet side housing 15 may be urged to approach each other by contracting the air cylinders 24 instead of the spring 23 and the contraction of the air cylinders 24 may be relieved only when the particulate filter 3 is rotated.

Figure 5:
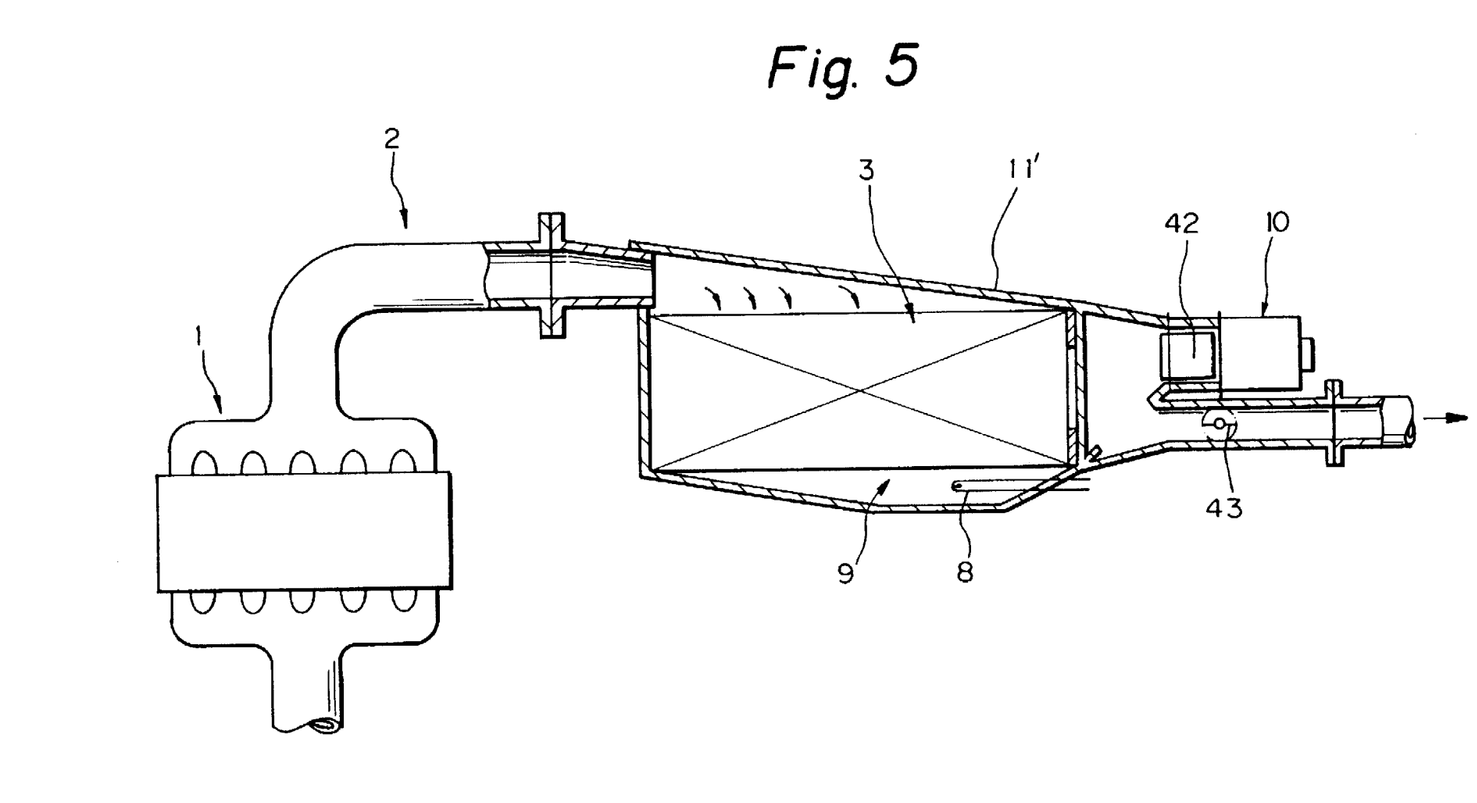
FIG. 5 is a side sectional view of another embodiment of this invention.
Figure 6:
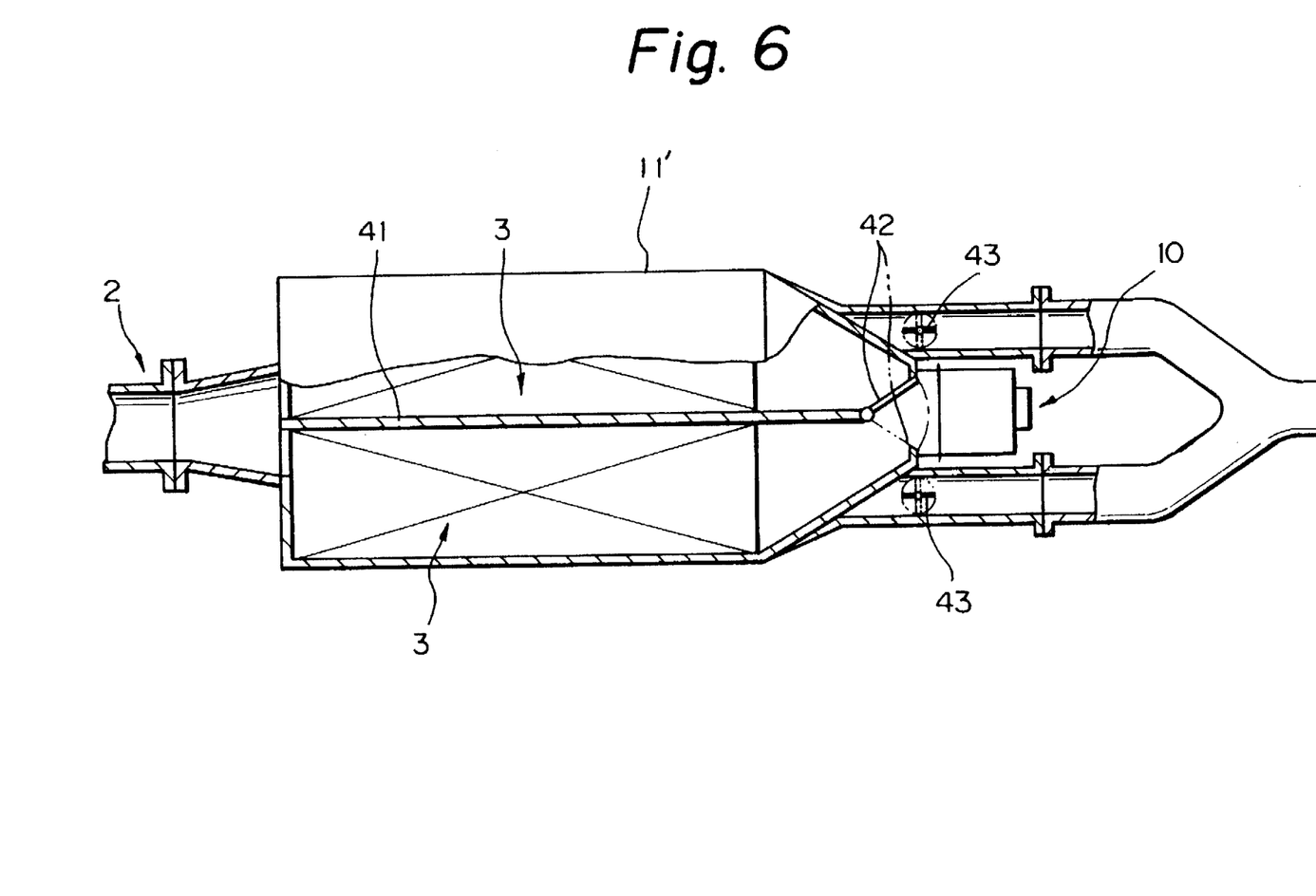
FIG. 6 is a top sectional view of said another embodiment of this invention.

FIGS. 5 and 6 show another embodiment of this invention, wherein like parts are represented by the same references as in FIGS. 1 to 4 and which includes two particulate filters 3 separated by a partition wall 41 within a filter case 11', an impact air valve 10 similar to the one shown in FIGS. 3 and 4 downstream of the particulate filters 3, a switchable damper 42 immediately upstream of the impact air valve and which can be switched when one of the particulate filters 3 separated by the partition wall 41 is back washed and regenerated, and an on-off valve 43 on the way of each of two lines of exhaust gas passage 2 connected to the downstream side of the filter case 11' for closing the exhaust passage 2 on the corresponding side when one of the particulate filters 3 is back washed and regenerated.

During the normal operation when the particulate filters 3 are not clogged in the example shown in FIGS. 5 and 6, particulates contained in exhaust gas discharged from the engine 1 are trapped by the particulate filters 3 while they pass through the particulate filters 3, and the exhaust gas is removed as clear gas.

When the particulate filters 3 are clogged with accumulated particulates and exhaust's efficiency is reduced after a period of operation, the switchable damper 42 is switched to the position shown by a solid line in FIG. 6, for example, and the on-off valve 43 on the exhaust passage 2 on the corresponding one side closes. By operating the impact air valve 10 in the same way as described above, an impact wave is generated and transferred all over the downstream end face of one particulate filter 3 so that particulates adhered to the particulate filter 3 are blown off into a particulate burning section 9 as shown in FIG. 5 and burned off in the particulate burning section 9 by the heat of a heater 8 electrically excited, whereby the one particulate filter 3 is freed from clogging to decrease exhaust resistance and ready to trap particulates again.

Once the particulate filter 3 on one line has been back washed and regenerated, the switchable damper 42 is switched to the position shown by a broken line in FIG. 6, for example, after the on-off valve 43 on the corresponding one line opens, and then the particulate filter 3 on the other line is back washed and regenerated in the same way as described above while the on-off valve 43 on the exhaust passage 2 on the other line is closed.

Also in the example shown in FIGS. 5 and 6, the particulate filters 3 can be reliably, efficiently and instantly back washed and regenerated in all zones which are not locally restricted.

In the illustrated examples described above which can instantly back wash the particulate filter 3 to regeneration, it is enough possible to provide a single line of the particulate filter 3 and a by-pass line diverting from the particulate filter 3 so that exhaust gas from the engine 1 is directed to the particulate filter 3 during the normal operation when the particulate filter 3 is not clogged, while the exhaust gas from the engine 1 is removed through the by-pass line diverting the particulate filter 3 when the particulate filter 3 is back washed by the impact air valve 10.

Naturally, the back washing and regenerating apparatus for a diesel particulate filter of this invention is not limited to the illustrated examples described above, but encompasses various changes within the scope of the subject-matter of this invention.

Effect of the Invention

As has been described, the back washing and regenerating apparatus for a diesel particulate filter of this invention has the remarkable advantage that the particulate filter can be reliably, efficiently and instantly back washed and regenerated in all zones which are not locally restricted.

What is claimed is:

1. A back washing and regenerating apparatus for a particulate filter in a diesel engine, wherein said particulate filter is placed along an exhaust passage of said diesel engine so that exhaust gas passes from an upstream side to a downstream side of said particulate filter, particulates in the exhaust gas are trapped by said particulate filter, and trapped particulates are separated from said particulate filter by an air blown in a direction from said downstream side to said upstream side of said particulate filter, comprising:

an impact wave generating mechanism is provided downstream of the particulate filter for generating an impact wave by instantly releasing a high-pressure air fed to a pressure accumulating chamber under action of a valve body so that the particulates are separated from the particulate filter by the impact wave and said blown air to regenerate said particulate filter, said pressure accumulating chamber being fed with a high pressure air contained in an air tank through a pressurizing port by switching on a first electromagnetic valve, said valve body being opened upon release of high pressure air from a pressure releasing chamber when a second electromagnetic valve is switched on in response to switching commands from a control unit.

2. An apparatus according to claim 1, wherein the particulate filter is in a form of a cylinder which is supported so as to rotate around an axis of said cylinder, one portion of said cylinder parallel to said axis permits exhaust gas to pass therethrough and particulates in said exhaust gas to be trapped, a particulate burning section is opened at an end face of the other portion of said cylinder parallel to said axis, an impact wave generating chamber of said impact wave generating mechanism is opened on the other end face of the other portion of said cylinder, said one portion of said cylinder is communicated with said particulate burning section and said impact wave generating chamber by rotating said cylinder around said axis.

3. An apparatus according to claim 2, wherein said particulate filter is secured in and is integrally rotatable with a cylindrical filter case having an upstream end face fitted in an upstream annular groove defined by an exhaust gas inlet side housing in pressing engagement with the inlet side housing and a downstream end face fitted in a downstream annular groove defined by an exhaust gas outlet side housing in pressing engagement with the outlet side housing, and said particulate filter rotates with said cylindrical filter case when the distance between said upstream annular groove and said downstream annular groove is slightly increased to move the inlet side housing out of pressing engagement with the upstream end face of the filter case and the outlet side housing out of pressing engagement with the downstream end face of the filter case.

4. An apparatus according to claim 1, wherein said impact wave generating mechanism is located on an exhaust gas outlet side housing and includes a pressure accumulating chamber, a pressure releasing chamber, an impact wave generating chamber, and a valve body inserted between said pressure releasing chamber and said impact wave generating chamber, said pressure accumulating chamber has a pressurizing port and is fed with a high-pressure air through a first electromagnetic valve and said pressurizing port, said pressure releasing chamber has a pressurizing outlet port and is fed with a high-pressure air through said pressurizing outlet port and a second electromagnetic valve, said impact wave generating chamber is opposed to a part of the downstream end face of said particulate filter, and said valve body instantly opens upon release of the high-pressure air from said pressure releasing chamber to connect said pressure accumulating chamber and said impact wave generating chamber through an outflow path and thereby generating an impact wave by a rapid expansion of the high-pressure air flown into said impact wave generating chamber.

5. An apparatus according to claim 1 comprising two particulate filters arranged in parallel within a filter case, an impact wave generating mechanism proximate to the downstream end face of said particulate filters, and a switchable damper disposed between said particulate filters and said impact wave generating mechanism, wherein said switchable damper is operable to connect any one of the particulate filters with the impact wave generating mechanism.

6. An apparatus according to claim 1, wherein said particulates separated from said particulate filter are burned off in a particulate burning section by the heat of an electrically excited heater.

7. An apparatus according to claim 1, wherein said control unit outputs said switching commands based on a detection signal from a pressure detector detecting pressure in said pressure accumulating chamber.

* * * * *

UNITED STATES PATENT AND TRADEMARK OFFICE
CERTIFICATE OF CORRECTION

PATENT NO.　：　　5,725,618
DATED　　　：　　March 10, 1998
INVENTOR(S) :
　　　　　　　　　Masatoshi Shimoda, et al.

It is certified that error appears in the above-identified patent and that said Letters Patent is hereby corrected as shown below:

On the title page item

[75] Inventors:　Please correct the spelling of the first named inventor from "Mastoshi" to --Masatoshi--.

[73] Assignee:　Please add the following name as a second Assignee in this patent --Chiyoda Automotive Industry Co., Ltd.--.

Signed and Sealed this

Twenty-fourth Day of April, 2001

Attest:

NICHOLAS P. GODICI

Attesting Officer

Acting Director of the United States Patent and Trademark Office